Sept. 21, 1971  F. W. MORRISON ET AL  3,606,749
MACHINE FOR HARVESTING TREE CROPS Filed June 23, 1969  3 Sheets-Sheet 2

Frank W. Morrison
Jerry E. Morrison
INVENTORS

BY Eugene M. Eckelman
Atty.

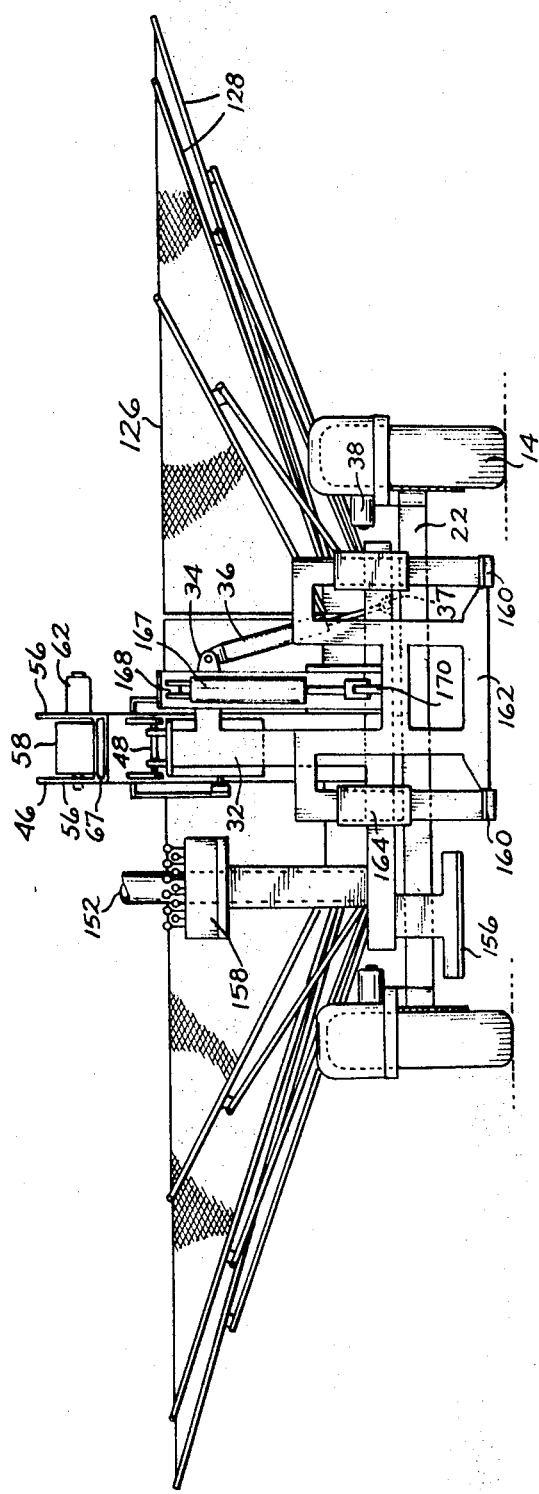
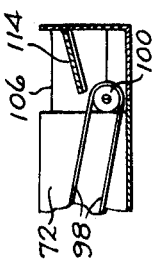
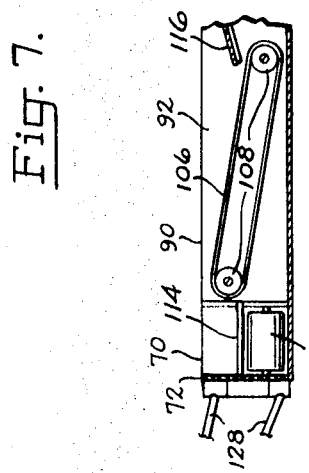
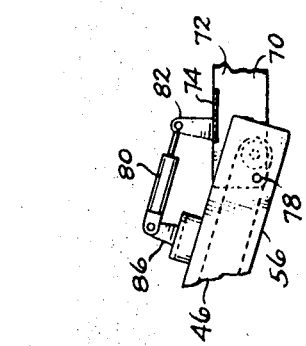
Frank W. Morrison
Jerry E. Morrison
INVENTORS

United States Patent Office 3,606,749
Patented Sept. 21, 1971

3,606,749
MACHINE FOR HARVESTING TREE CROPS
Frank W. Morrison and Jerry E. Morrison, both of
2408 E. 14th St., Rte. 1, The Dalles, Oreg. 97338
Filed June 23, 1969, Ser. No. 835,605
Int. Cl. A01g *19/06*
U.S. Cl. 56—329   10 Claims

ABSTRACT OF THE DISCLOSURE

The machine of the invention has a wheeled frame supporting an elongated longitudinally and laterally tiltable conveyor. The forward end of the conveyor carries a collecting unit having a head comprising a pair of flared arms each pivotally supporting an extension capable of opening movement to receive a tree in the opening and capable of closing for encompassing the trunk of the tree. The arms and extensions have conveyors therein which deposit fallen crop in the longitudinal conveyor. The head has pivotal outriggers thereon supporting a flexible collecting apron, and fluid operated cylinders are provided for moving the arm extensions and the apron between open and closed positions. Power driven adjustment means are provided at a pivot connection between the longitudinal conveyor and the head for varying the longitudinal angular tilt of the latter. Power driven adjustment means are also provided for varying the lateral tilt of the conveyor. The machine has blower means for separating dust and leaves from the harvested crop. Tiltable lifting forks are provided at the rearward end of the machine for supporting tote boxes or the like.

BACKGROUND OF THE INVENTION

This invention relates to new and useful improvements in machines for harvesting tree crops.

Fruit and nut catching machines have heretofore been provided which have foldable collecting units arranged to encircle tree trunks to catch the fruit or nuts shaken from the tree. The machines heretofore employed have not been entirely satisfactory in view of their lack of versatility particularly as concerning the difficulty of maneuvering them in the orchard and the difficulty of disposing the collecting unit in a most efficient plane relative to the ground. Prior devices also have the disadvantage that they are bulky, of complex structure, and difficult to operate.

SUMMARY OF THE INVENTION

According to the present invention there is provided a machine for harvesting tree crops which overcomes disadvantages set forth above in that it is highly maneuverable, easy to operate even by a single operator, and has adjustment means capable of positioning a collecting unit in a level position relative to the ground.

More particularly the present invention provides a machine for harvesting tree crops employing a wheeled frame on which a longitudinal conveyor is laterally tiltable as well as longitudinally tiltable, thus assisting in placing a collecting unit supported on the forward end of the longitudinal conveyor in a level position; to provide a collecting unit having a head portion provided with a pivotal attachment to the forward end of the longitudinal conveyor, said pivotal attachment permitting further longitudinal leveling adjustment of the catcher frame; to provide a collecting unit having a novel conveyor system wherein fruit or nuts which fall on the collecting unit are conveyed to the longitudinal conveyor; and also to provide in the collecting unit a novel head and outrigger arrangement foldable into a compact unit for traveling on the road or maneuvering through trees.

Another object is to provide in a machine of the type described a lifting support for containers which receives fruit or nuts from a longitudinal conveyor, such support being tiltable for convenient engagement with and disengagement from a container.

The invention will be better understood and additional objects and advantages will become apparent from the following description taken in connection with the accompanying drawings which illustrate a preferred form of the device.

BRIEF DESCRIPTION OF THE DRAWINGS

FIG. 4 is a rear elevational view of the machine;

FIG. 5 is a fragmentary elevational view of container support means taken on the line 5—5 of FIG. 1;

FIG. 6 is a fragmentary sectional view taken on the line 6—6 of FIG. 1;

FIG. 7 is an enlarged fragmentary sectional view taken on the line 7—7 of FIG. 1; and FIG. 8 is a fragmentary sectional view taken on the line 8—8 of FIG. 1.

DETAILED DESCRIPTION OF THE PREFERRED EMBODIMENT

Figure 1:
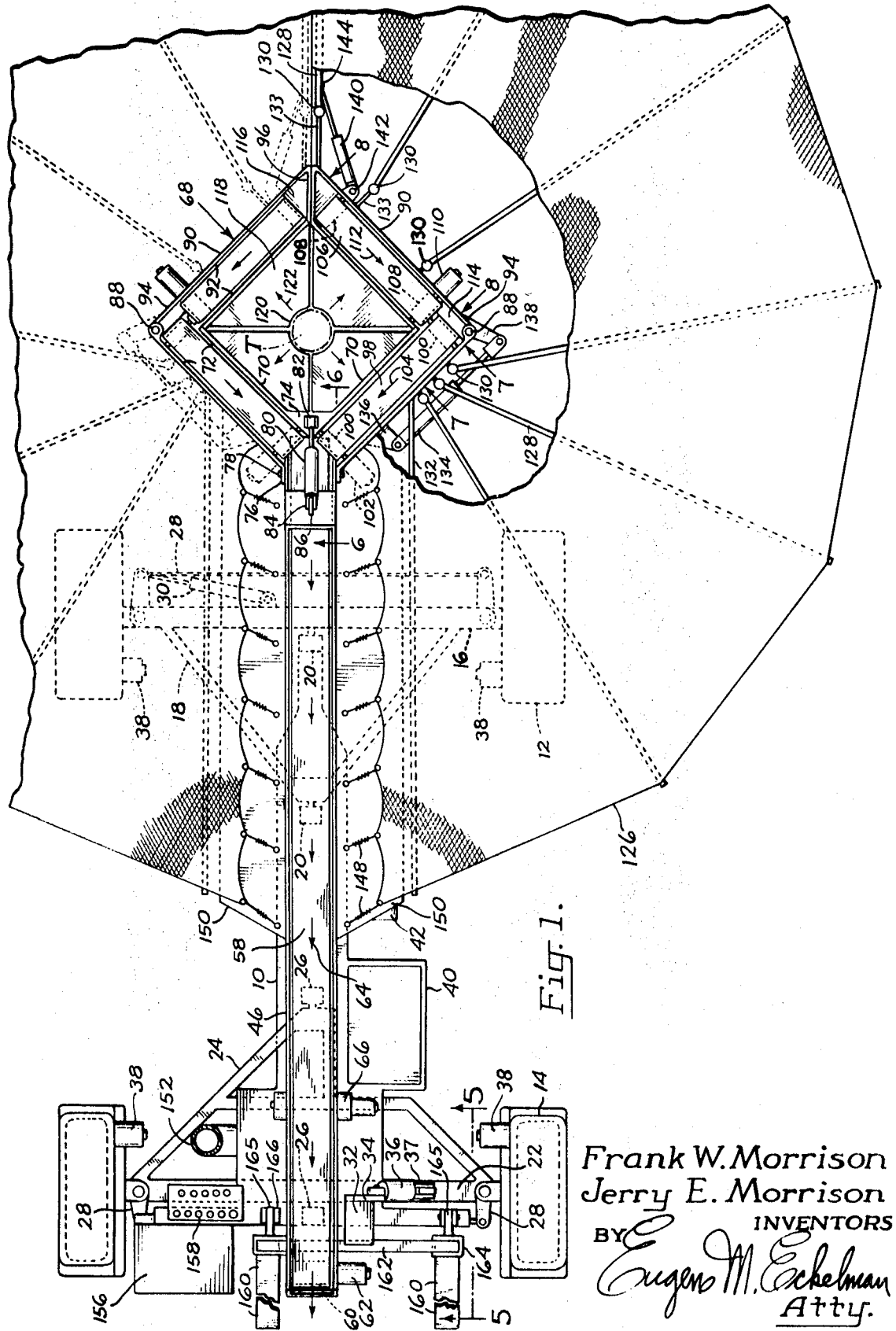
FIG. 1 is a fragmentary plan view of the machine of the present invention, a portion of the structure being broken away for clarity.

Referring in particular to the drawings, the present machine for harvesting tree crops comprises a self-contained unit capable of transporting itself to an orchard and of maneuvering itself in the orchard for placement under individual trees. Such machine comprises a longitudinal frame 10, FIGS. 1 and 2, having front wheels 12 and rear wheels 14. In a preferred construction, the front and rear wheels have a suspension which allows them to follow an uneven contour of the ground. More particularly, front wheels 12 are mounted on an axle 16, FIGS. 1 and 2, having a rearwardly extending integral yoke 18, and bearing connections 20 having a longitudinal axis are provided between the front wheel assembly and the frame 10 to provide lateral tilting of the front axle. Similarly, rear wheels 14 are mounted on an axle 22 having an integral yoke 24, and bearing connections 26 having a longitudinal axis are provided between the rear wheel assembly and the frame 10 to permit lateral tilting of the axle 22. With the individual connections of the front and rear axles to the frame, it is apparent that the vehicle will have four wheel support on the ground at all times.

Each of the front and rear wheel assemblies is steerable by suitable steering means 28 operated by individually operable fluid operated cylinders 30 connected between the steering means 28 and the axles. With both the front and rear axles being steerable the machine is extremely maneuverable.

Connection of the frame 10 for upright stability is accomplished by an upright frame member 32, also seen in FIG. 4, secured integrally to the rearward end of the frame and having a projecting ear 34 to which is pivotally connected the piston rod end of an outwardly angled fluid operated cylinder 36. The base end of cylinder 36 is pivotally connected to an ear 37 on an outer portion of the rear axle 22. Not only does the cylinder 36 serve to stabilize the frame 10 on its wheeled support but by operation of such cylinder the frame can be tilted relative to the axles for a purpose to be described in greater detail hereinafter.

The vehicle is driven in a suitable manner, preferably by individual fluid operated motors 38 driven by a suitable drive system. The numeral 40 designates generally the drive motor for the powered fluid system and the numeral 42 designates generally the reserve fluid tank. The fluid drive system and control means for the apparatus thus far described and for appartus to be described hereinafter are not detailed since such comprises conventional structure.

Figure 2:
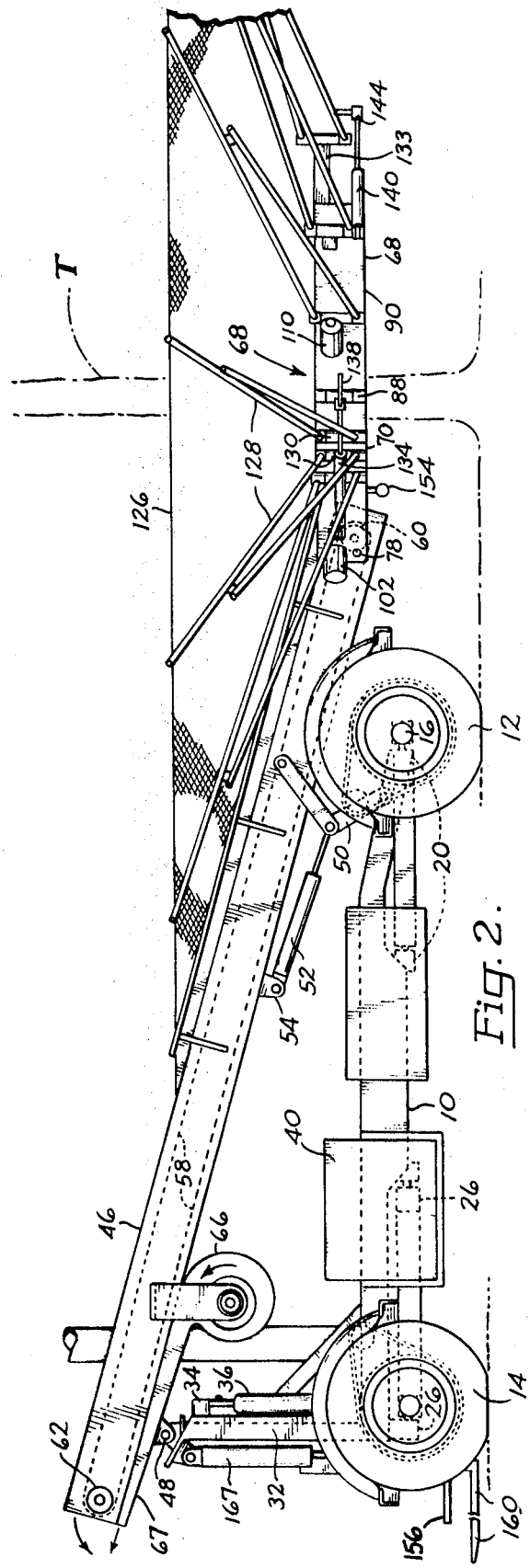
FIG. 2 is a fragmentary side elevational view of the machine.

A longitudinally disposed conveyor 46 has a pivotal connection 48, FIGS. 2 and 4, adjacent its rearward end with the upright frame member 32, allowing the longitudinal angular relationship of the conveyor relative to the frame of the machine to be varied. The forward end of the conveyor 46 has a toggle link connection 50, FIG. 2, with the frame 10, and a fluid operated cylinder 52 has its base end pivotally connected to an ear 54 on the bottom side of the conveyor 46 and its piston rod end pivotally connected to the toggle linkage, whereupon such cylinder is arranged to provide the mentioned angular adjustment of the conveyor 46. It will be noted from FIG. 2 that the conveyor 46 projects beyond both the forward and rearward ends of the wheeled frame.

Conveyor 46 is channel shaped, having side walls 56, FIG. 4 between which operates a conveyor belt 58. Such belt operates over end rollers 60. FIGS. 1 and 2. One of the rollers 60, such as the rear one as illustrated herein, is driven by a fluid operated motor 62 and operates the conveyor in the direction of arrows 64, FIG. 1. A blower 66 is supported on the underside of conveyor 46 and has an outlet or nozzle end 67 at the rearward portion of the conveyor 46, thus serving to blow away leaves and dust from the picked articles flowing over the end of the conveyor belt 58.

The harvesting machine carries a front collecting unit arranged to be positioned under a tree. Such collecting unit employs a head 68, FIGS. 1, 2 and 3, having a pair of flared arms 70 which comprise channel-shaped conveyor housing having side walls 72. Arms 70 are securely fixed together in an integral structure by a web plate 74, FIGS. 1 and 6, and each of the outside walls of the arms 70 has a rearwardly extending angular portion 76 pivotally connected at 78 to respective side walls 56 of conveyor 46 at the front of the latter. Arms 70 are held in their outright position by a fluid operated cylinder 80 having a pivotal connection at its piston rod end to an ear 82 on the web plate 74 and having a pivotal connection at its base end to an ear 84 on a plate 86 secured on the conveyor 46 a short distance rearward of the front end of such conveyor. It is apparent that by operation of the cylinder 80, the angular disposition of the arms 70 relative to the conveyor 46 can be varied.

Figure 3:
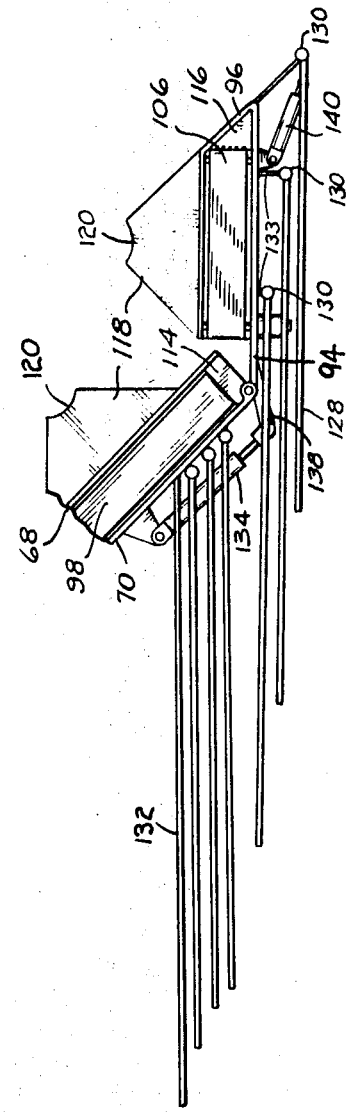
FIG. 3 is a fragmentary elevational view showing the head portion of the collecting unit in open position.

The outer ends of the arms 70 have a pivotal support connection 88 for arm extensions 90 which similar to arms 70 also comprise channel-shaped housings having side walls 92. Each of the extensions 90 has a projecting end portion 94 on its outer wall and at the rearward end thereof, and this projecting end portion terminates rearwardly in the pivotal connection 88. The projecting end portions 94 permit the arm extensions 90 to extend either at a right angle to their respective arms 70 in a closed position of the head, as best seen in FIG. 1, or in a forwardly projecting relation in an open position of the head as seen in FIG. 3. Each of the outer ends 96 of arm extensions 90 is angled so as to fit together in a mitered joint in the closed position of the head.

The head 68 includes a conveyor system in the arms 70 as well as in their extensions 90. Each of channel-shaped arms 70 has a conveyor belt 98 therein, such belts operating over end rollers 100 in the arms and driven by fluid operated motors 102 in the direction of arrows 104, FIG. 1. Conveyors 98 are arranged to discharge onto conveyor 58.

Channel-shaped arm extensions 90 also have a conveyor belt 106 disposed therein. These belts operate over end rollers 108 in the extensions and one of such rollers in each arm extension is driven by a fluid operated motor 110 in the direction of arrows 112, FIG. 1. With particular reference to FIGS. 7 and 8, the conveyor belts 98 and 106 are inclined in their housings such that the conveyors 106 discharge onto their respective conveyors 98. To fill in the corners beyond the ends of rollers 100, angled baffle plates 114 are provided integrally on the arms 70 at the outer ends thereof. The outer ends of arms 90 also have baffle plates 116 for filling in the corners at the angled ends 96. Such baffle plates 116 are inclined toward the conveyors.

Each of the arms 70 and extensions 90 thereof is provided with an inwardly directed, triangular baffle member 118 to enclose the central area of the head 68. These baffle members have a notched apex portion 120 in which the trunk of a tree T is adapted to be placed, as will be more fully described herein after. The outer or connecting ends of the baffle members 118 are at least as high as the upper edge of their respective support members and are inclined upwardly toward their apex so as to provide an inclined surface whereby harvested articles travel by gravity into the conveyors of the head, namely, in the direction of arrows 122, FIG. 1. Baffle members 118 preferably are constructed of a resilient material or are padded to provide a soft landing surface for the harvested articles.

Head 68 supports an apron 126 of flexible sheet material such as canvas or plastic, and structure is provided such that the apron is moved to a collapsed or folded position when the arm extensions 90 of the head are moved on their pivot connections 88 to an open position as in FIG. 3. To accomplish such function, the apron 126 is supported on outriggers 128 some of which are attached to arms 70 and some of which are attached to extensions 90 by vertical axis pivot connections 130. All of such arms have pivotal connection to the respective members 70 and 90 with the exception of an innermost arm 132 on each side which extends rearwardly parallel to the frame of the machine and which is integrated at its forward end, such as by welding, to arms 70. As apparent in FIG. 1, the head has identical structure on each side of the longitudinal center line thereof, and the apron 126 comprises two parts also of identical structure.

Pivot connections 130 on the arm extensions 90 are supported on outwardly extending brackets 133, such brackets being of a length to allow the outriggers supported thereby to fold rearwardly in outward clearance of the head and other outriggers. For this purpose, the brackets have increasing length toward the front.

Fluid operated cylinders 134 have their base ends pivotally connected to ears 136 secured integrally to respective side walls of arms 70 and their piston rod ends pivotally connected to lever arms 138 secured integrally to arm extensions 90. It is apparent that by retracting the piston rods of cylinders 134 the arm extensions 90 are pivoted outwardly which of course provides for partial collapse or folding of the apron for reducing the overall dimension thereof. It is desired, however, that the outrigger arms be fully collapsed rearwardly against the side of the machine, as shown in FIG. 3, and for this purpose fluid operated cylinders 140 have their base ends pivotally connected to ears 142 on an outer side wall portion of arms 90 adjacent the forward end of the latter and their piston rod ends pivotally connected at 144 with the forwardmost outriggers 128. The pivotal connections 144 are forward of the pivot connections 130 and thus a lever arrangement is provided whereby when the piston rods of cylinders 140 are retracted, a substantial pivotal travel of the forwardmost outriggers take place. Cylinders 134 and 140 have common control whereby their piston rods are simultaneously retracted or extended. Thus, when the arms 90 are opened on the pivot connections 88 by means of the cylinders 134, the cylinders 140 simultaneously retract the forwardmost outriggers 128 whereby in the fully open position of the arm extensions 90 the forwardmost outriggers extend rearwardly in parallel relation to the frame of the machine. The forwardmost outriggers 128 in moving to such rearwardly extending position push other arms to a similar position. The apron 126 merely sags in between the outriggers as the latter are folded together. Such collapse of the apron 126 reduces the overall length and width of the machine a substantially amount to provide convenient transportation from place to place as well as efficient maneuverability within an orchard itself.

The rearward edges of apron 126 have spring connection, by tension springs 148, to lateral wing portions 150 forming an integral part of conveyor 46, such wing portions being adapted to provide catch means in the area between the conveyor 46 and the edge of cover 126. Wing portions 150 preferably have an upper padded surface to prevent damage to articles falling thereon.

The frame 10 carries an upright support 152 at the rearward end thereof for shaker mechanism designed to engage branches of a tree for shaking off the crop to be harvested. Details of the branch shaking mechanism are not shown herein since such mechanism is of well known structure. The present machine is also designed to carry trunk shaking apparatus, and for this purpose a support 154, FIG. 2, is integrated with the head 68 to connect such apparatus thereto. The details of such trunk shaking apparatus also are not detailed since such apparatus is well known in the art. Frame 10 at the rear portion thereof supports an operator's platform 156 and a suitable control panel 158 for operating the hydraulic cylinders on the machine.

It is desirable that container means be supported on the present machine for receiving the harvested articles from the conveyor 46, and for this purpose, and with particular reference to FIGS. 1, 2, 4 and 5, lift truck type forks 160 are provided on a vertically disposed frame 162 having slidable guided movement in guide sleeves 164 with rearwardly projecting integral arms 165 pivotally connected to upstanding ears 166 secured to the frame 10. A vertically disposed fluid operated cylinder 167 has its base end pivotally connected to an ear 168 at the upper end of upright frame member 32 and its piston rod end pivotally connected to an ear 170 integrated with the lift frame 162. The frame 162 is thus arranged to support a container under the discharge end of the conveyor 46, and by means of the lift frame 162 such container can be raised off the ground for convenient movement therewith. With particular reference to FIG. 5, the lift frame 162 has an integral upwardly and rearwardly inclined arm 171, FIG. 5, carrying a roller 172 on its upper end. This roller operates on a vertical, forwardly facing cam surface 174 on frame 32 having a bottom rearwardly extending notch 176. The arrangement is such that the lift frame 162 will be maintained in a vertical plane with the forks horizontal in a lift position of such frame, namely, when the roller 172 engages the cam surface 174. However in a lowered position of the lift frame, the roller 172 drops into the notch 176 and allows the lift frame and consequently the forks to pivot counterclockwise to the dotted line position shown in FIG. 5. Such tilting movement of the forks 160 permits easy pickup and dropping of containers.

In accordance with the present invention, a fruit and nut harvesting machine is provided having many features. First, it is self-contained and can be operated by a single operator about an orchard. Such result is accomplished by the present machine being self-propelled, having power drive means for opening and closing the apron 126 around a tree and for leveling adjustment, and having means for handling a container for the harvested articles.

Second, it employs an umbrella type apron which is capable of being folded into a compact unit to reduce the size of the machine to allow the latter to travel on the road or within the orchard. As stated above, such apron automatically retracts to its reduced size upon opening of the head 68.

Third, provision is made for catching substantially all the articles from a tree T including the area around the trunk. The machine is readily movable into association with a tree by first opening the arm extensions 90 and moving the machine straight into the tree to position the trunk centrally of the head 68. Arm extensions 90 may then be closed around the tree.

Fourth, the collecting mechanism is provided on the front end of the machine and thus the machine is capable of having a short wheel base to increase its maneuverability. In this regard, the maneuverability of the machine is increased by the double end steering.

Fifth, the head 68 is adapted to be leveled and thus the machine has efficient usage on unlevel ground. The leveling is accomplished by the fluid operated cylinder 80 which can pivot the head 68 longitudinally and by the angled cylinder 36 which can pivot the frame laterally. Thus, longitudinal and lateral leveling is readily accomplished according to the terrain on which the machine is operating. Furthermore, the longitudinal and lateral angle of tilt of conveyor 46 can be adjusted, such adjustment being determined by the terrain as well as by the structure of the tree and used in conjunction with pivotal adjustment of head 68 thereon to provide desired leveling of the apron 126.

Sixth, the harvested articles have straight flow-through on the conveyors and are not subjected to any damaging tumbling action.

It is to be understood that the form of our invention herein shown and described is to be taken as a preferred example of the same and that various changes in the shape, size and arrangement of parts may be resorted to without departing from the spirit of our invention. For example, the outriggers 128 may be extensible to vary the radial dimension of the catching unit.

Having thus described our invention, we claim:

1. A machine for harvesting tree crops comprising
    (a) a frame having forward and rearward ends,
    (b) wheel means on the frame,
    (c) longitudinal conveyor means on the frame,
    (d) a head on the forward end of the machine,
    (e) means in the head defining a central opening arranged to receive a tree trunk,
    (f) a forward portion of the head being openable to permit movement of the head to a position for receiving a tree trunk in the central opening,
    (g) collecting means in said head for catching crop articles which fall closely adjacent to the tree trunk,
    (h) said collecting means including a power driven conveyor arranged to receive crop articles from said collecting means and arranged to carry the crop articles in a rearward direction and deposit them on said longitudinal conveyor,
    (i) and an enlarged apron leading outwardly from the head in encompassing relation for collecting a portion of the fallen crop,
    (j) said apron conveying the fallen crop articles by gravity to the conveyor means in the head.

2. The harvesting machine of claim 1 wherein the head is supported on the forward end of the longitudinal conveyor by a pivotal connection having a laterally extending horizontal axis, and means connected to the head arranged to adjust it on the pivotal connection to vary the longitudinal tilt thereof relative to the ground.

3. The harvesting machine of claim 2 including means connected between the frame and the longitudinal conveyor means arranged to tilt the longitudinal conveyor means laterally to vary the lateral tilt of the head relative to the ground.

4. The harvesting machine of claim 1 wherein the head is supported on the forward end of the longitudinal conveyor means, and including means connected between the frame and the longitudinal conveyor means arranged to tilt the longitudinal conveyor means laterally to vary the lateral tilt of the head relative to the ground.

5. The harvesting machine of claim 1 wherein the head comprises an enclosing frame and the means defining the central opening comprises flexible filler members projecting inwardly from said enclosing frame.

6. The harvesting machine of claim 1 wherein the means defining the central opening comprises flexible filler members projecting inwardly and upwardly to collect fallen crop and convey it to said conveyor in the head, said apron extending outwardly and upwardly from said head to collect fallen crop and convey it to said conveyor.

7. The harvesting machine of claim 1 wherein the head includes a pair of outwardly flared arms and the openable portion thereof comprises arm extensions pivotally connected to the forward ends of the arms on an upright axis, the arm extensions being pivotal outwardly on their respective arms to permit the head to receive a tree trunk in the head and being pivotal inwardly to form the defining opening, the conveyor in the head comprising a conveyor in each of the arms and arm extensions, the conveyors in the arm extensions directing fallen crop to the conveyors in the arms and the conveyors in the arms directing the fallen crop to the longitudinal conveyor.

8. The harvesting machine of claim 1 wherein the wheel means comprise front and rear wheel assemblies, each of the front and rear wheel assemblies being individually steerable.

9. The harvesting machine of claim 1 including a vertically movable, container-supporting projection on the frame, and means operably connected to the container-supporting projection causing the latter to tilt down in a lower portion of its vertical movement.

10. The harvesting machine of claim 1 including blower means having an outlet under the rearward end of the longitudinal conveyor means and arranged to blow foreign material from fallen crop as the latter discharges from the end of the conveyor.

References Cited
UNITED STATES PATENTS
3,482,382   12/1969   Gebendinger _____ 56—329

FOREIGN PATENTS
259,926   2/1968   Austria _____ 56—329
436,826   11/1967   Switzerland _____ 56—329
769,376   10/1967   Canada _____ 56—329

ROBERT PESHOCK, Primary Examiner